United States Patent [19]
Stade

[11] 3,728,907
[45] Apr. 24, 1973

[54] WORM DRIVE
[75] Inventor: Gerhard Stade, Berlin, Germany
[73] Assignee: Herbert Lindner GmbH, Berlin, Germany
[22] Filed: Dec. 8, 1971
[21] Appl. No.: 206,092

[30] Foreign Application Priority Data

Jan. 15, 1971  Germany.....................P 21 03 537.0

[52] U.S. Cl..........................................74/425, 74/458
[51] Int. Cl............................F16h 1/16, F16h 55/04
[58] Field of Search.......................74/425, 427, 458

[56] References Cited

UNITED STATES PATENTS 3,695,119   10/1972   Stade......................................74/427

FOREIGN PATENTS OR APPLICATIONS 855,927   11/1952   Germany
904,444   2/1954   Germany

*Primary Examiner*—Leonard H. Gerin
*Attorney*—John J. McGlew et al.

[57] ABSTRACT

A worm drive includes a cylindrical worm and a worm gear, having arcuated corresponding engaging tooth flank profiles, with a mesh or contact line in the engaging region. The flanks of the teeth of the worm gear each consist of at least two flank parts engaging with the flanks of the worm gear teeth. One flank part, in the axial section through the worm, has a profile inclined relative to a perpendicular to the worm axis and which profile may be rectilinear, slightly convex, or slightly concave. The other flank part, in the axial section through the worm, has a sharply curved profile. The mesh or contact line reverses in the engaging region. The flank part having the sharply curved profile may be convex toward the worm gear or may be concave toward the worm gear. Alternatively, the flank part having the sharply curved profile may include a part convex toward the worm gear, a part concave toward the worm gear, and a substantially rectilinear part interconnecting the convex and concave parts. As a modification, the profile of the worm, in the axial section through the worm, may comprise a single curve having one part sharply curved and the other part slightly curved.

11 Claims, 12 Drawing Figures

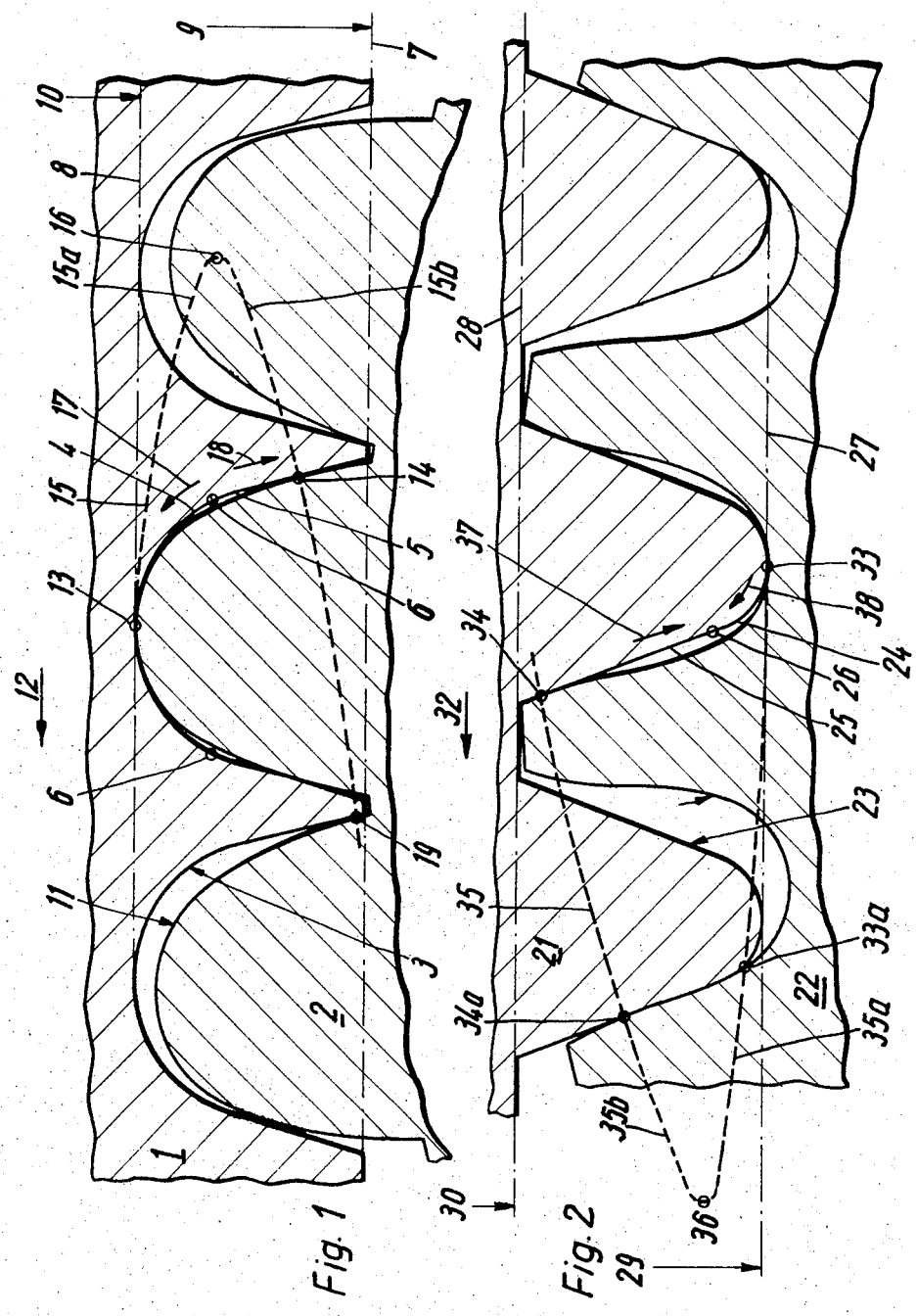

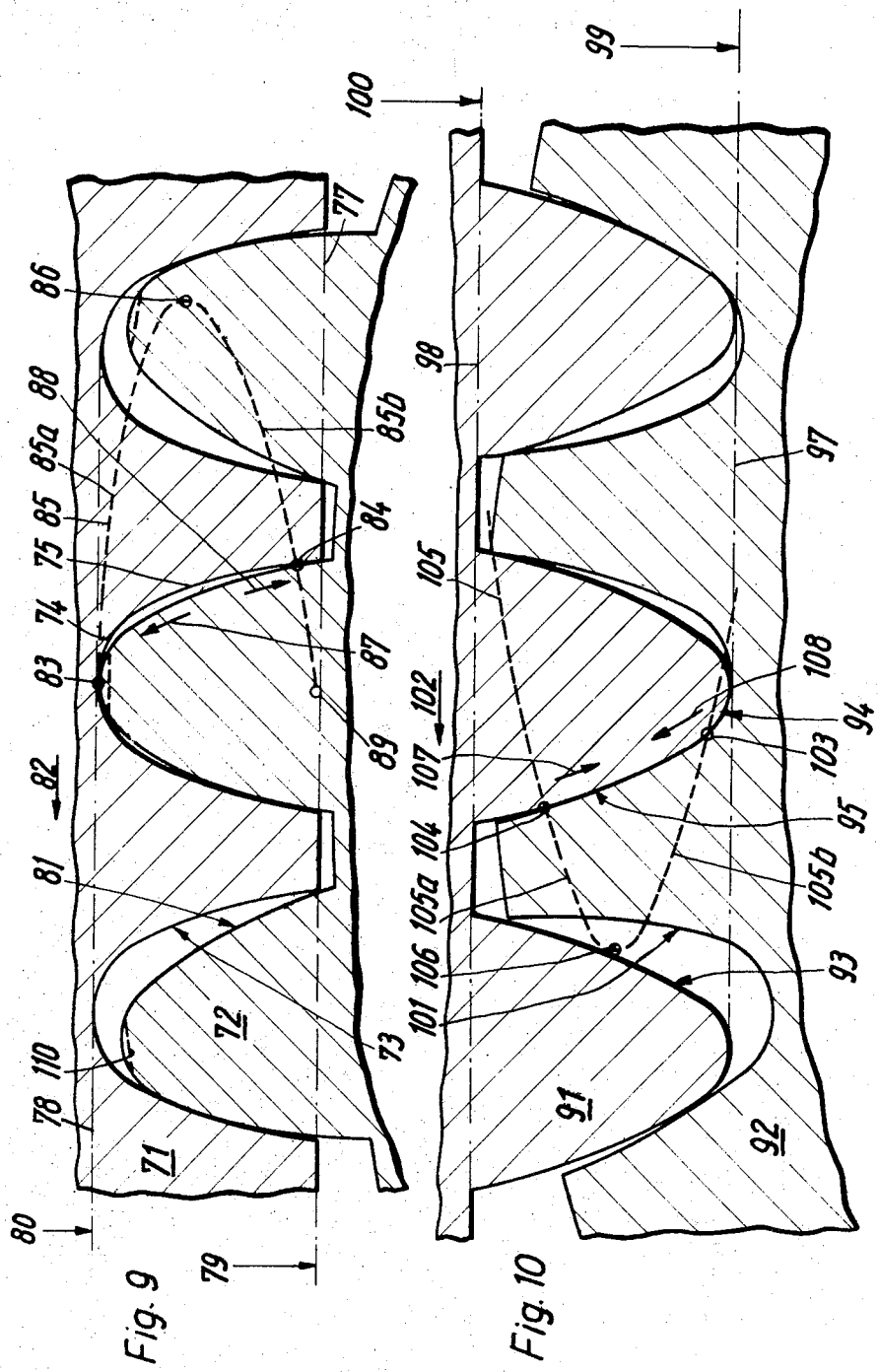

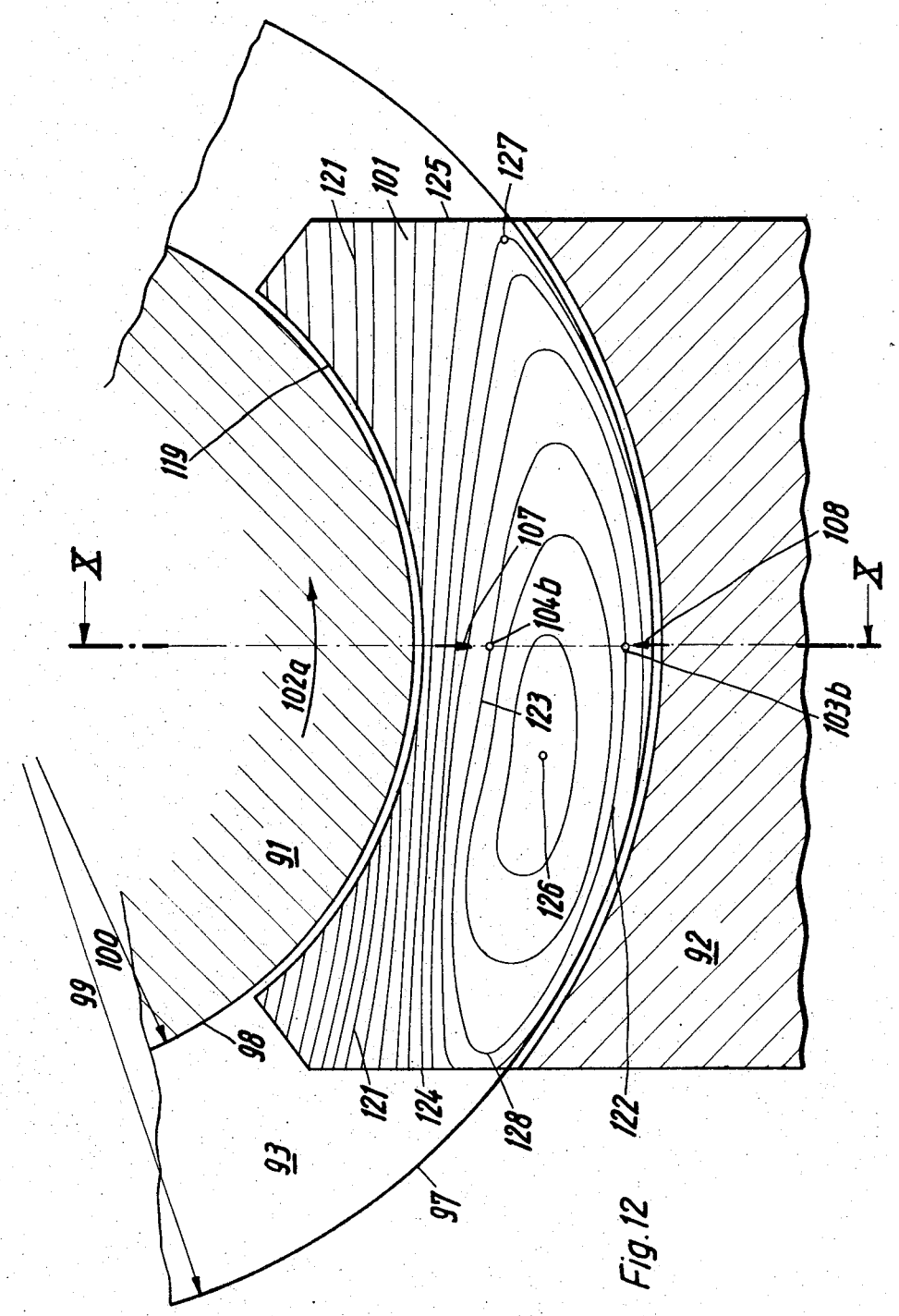

WORM DRIVE

FIELD OF THE INVENTION

This invention relates to worm drives and, more particularly, to a worm drive including a cylindrical worm and a worm gear and in which the engaging and lubricating properties are substantially improved and which can transmit higher torques with greater efficiency.

BACKGROUND OF THE INVENTION

Progress in the design and construction of worm drives having cylindrical worms has been attained mainly due to the work of David Brown and Gustav Niemann. Brown was the first to produce ground worms whose tooth flanks had an exactly defined involute profile. This profile was independent of the diameter of the grinding disc, so that worms of one type could be paired at random, with their respective worm gears.

Nieman created a new type of worm, the hollow flank worm, whose efficiency is generally much greater than the efficiency of involute worms. However, the hollow flank form varies in dependence on the diameter of the grinding disc. The meshing tooth flanks of worms and worm gears are in contact with each other along a curve, the contact or mesh line. When the worm turns, this contact line moves. In the engagement range, a certain contact line on the tooth flanks of the worm and the worm gear is therefore associated with each position of the worm gear.

If the tooth flank of a worm gear is paired with an involute worm, practically straight contact lines are formed, and these extend from one plane surface of the gear to the other. On the worm gear tooth flank there appear, at first, contact lines on the addendum circle of the worm gear, and which move, in the course of rotation, to the dedendum circle. On the worm tooth flank, these contact lines move correspondingly from the dedendum circle of the worm to the addendum circle of the worm.

The contact lines pierce the plane of the intersection of the axes of the worm and worm gear. They yield, on the worm flank, a sequence of contact points which move, in the course of rotation of the worm and worm gear, from the dedendum circle of the worm to the addendum circle of the worm, so that there is obtained a practically straight or rectilinear mesh line.

Involute worms belong to that type of worms whose flanks extend preferably rectilinearly, for example, in the axial section plane, this straight line forming, with the perpendicular to the worm axis, the angle of mesh of the axial section. The flanks of involute worms are slightly convex, compared to the straight lines, while the flanks of worms according to Niemann, however, are slightly concave. These types of worms have, in common, the characteristic that the contact lines move, in the course of the engagement of the worm tooth flanks and the worm gear tooth flanks, from the dedendum circle of the worm to the addendum circle of the worm.

The problem of flank friction and that of transmission of torque are closely related. In involute worm drives, no marked lubricating pressure can be formed because of the practically straight rectilinear course of the contact lines between the meshing tooth flanks. Involute worms, therefore, exhibit a power loss, which is due to the friction between the tooth flanks of the worm and those of the worm gear.

Almost similar conditions occur in a trapezoidal worm drive, which Niemann compares, in his German Pat. No. 855,927, with his hollow flank worm drive. In the trapezoidal worm drive, there is obtained a straight mesh line and, between the engaging tooth flanks in each position of the rotating worm gear, a single contact line which appears, in the main region, as a continuous contact line and, outside the main region, as an interrupted line. The interrupted contact lines, however, are line sections of a single contact line which is interrupted by the dedendum circle of the worm. The two contact line sections appear, however, only outside the main engaging range of the flanks, and cannot improve their engaging behavior.

The same interrupted contact lines appear also in the hollow flank worm drive according to Niemann, where the mesh line is curved in one direction. There results, from the course of the curved but unilaterally formed mesh line, that, in the worm drive according to Niemann also, only a single contact line is formed in each position of the rotating worm gear, between the engaging tooth flanks of the worm drive, and that the interrupted contact lines in the secondary region must be considered parts of this single contact line. The mesh line in axial section has always only a single intersection with one and the same tooth flank in Niemann also, just as in the trapezoidal worm drive used for comparison.

For practically three decades, those skilled in the art were content with the progress achieved in the hollow flank worm drive according to Niemann, where the worm teeth have a concave flank profile. However, what was achieved was only a better meshing of the tooth flank profiles, as compared to the involute worm drive, so that a stronger lubrication film can be maintained between the hollow flank tooth and the respective crowned worm gear tooth. The supporting or engaging behavior of the hollow flank worm is not always sufficient, however, at high stresses and with high torques to be transmitted.

SUMMARY OF THE INVENTION

The principal objective of the invention is to provide a worm drive, of the type described above, which is not confined to the hollow flank worm and whose engaging and lubricating characteristics are substantially improved as compared to known worm drives using cylindrical worms, and which therefore can transmit higher torques with greater efficiency.

In accordance with the present invention, this problem is solved in that the flanks of the worm teeth consist of at least two parts engaging with the flanks of the worm gear teeth, of which one part has, in an axial section through the worm, a profile which is inclined with respect to a perpendicular to the worm axis and which profile is either straight, slightly concave or slightly convex. The other part is sharply curved, and the mesh line is reserved in the engaging or supporting region.

It is important, in accordance with the present invention, that both axial section profiles are engaging flank parts, hence also the added sharply curved part of the axial section profile, which bears either on the root or on the outer cylinder of the worm. In the axial section, there are thus formed, in each position of the rotating worm gear and on one and the same worm tooth flank, two contact points with the worm gear tooth flank and thus, associated therewith, two contact lines. In contrast to Niemann, these are not sections of one and the same contact line, but are two independent contact lines each of which corresponds to a series of lines. There results, from the combined flank form whose mesh line reverses in the engaging or supporting region, that the two contact points on the same tooth flank of the worm either tend toward a common contact point, in the course of rotation of the worm and the worm gear, as is the case with a convex tooth form, or, with a concave tooth form, move apart, starting from the common contact point.

In planes which extend parallel to the axial section plane, the engagement of the tooth flanks of the worm and worm gear show a comparable behavior. There is thus obtained, on the worm gear tooth flanks, contact lines which tend, with a convex worm tooth form, toward a common contact point, and which move away from a common contact point with a concave worm tooth form.

The presence of two contact lines effects a closer meshing of the tooth flanks than is possible with only one contact line and with interrupted contact lines in the secondary supporting region. Here capillary forces are active which retain the oil in the oil chambers between the flanks. The more effective sealing of the very narrow oil chambers represents an advantage of the new worm drive with concave teeth, as compared to the hollow-flank worms of Niemann, where the single contact line is only so bent, in the end phase of the mesh, that it encloses a space that is open toward the outer cylinder of the worm.

The mesh and the engaging characteristics of the invention worm with convex teeth provides even more favorable contact lines. These close to a self-contained line and thus form a completely closed oil chamber which diminishes, in the course of rotation of the worm and worm gear. The oil contained in the chamber is compressed and must issue through the gap formed by the tooth flanks of the worm and worm gear along the contact line. The oil issuing through this flank gap is forced out of the oil chamber with the force produced by the load of the teeth. The drive with convex worm teeth therefore has the best lubricating properties, since the oil gap between the flanks of the worm teeth and the worm gear teeth adjusts itself automatically to the torque to be transmitted.

In the invention worm drive, any dry friction in the course of the mesh is impossible, and the load capacity of the drive depends only on the mechanical properties of the teeth, but no longer on the antifriction properties of the teeth flanks. The supporting or engaging behavior is considerably improved as compared to known worm drives.

With a worm having a convex tooth form, the sharply curved part of the axial section profile of the worm is convex toward the worm gear, and bears on the outer cylinder of the worm.

With a concave worm tooth form, the sharply curved part in the axial section profile of the worm is concave toward the worm gear and bears on the root cylinder of the worm.

It is also possible to combine the two tooth forms, in which case the axial section profile of the worm consists of a convex part sharply curved toward the worm gear, and of a concave part sharply curved toward the worm gear, while both parts are interconnected by a straight or slightly curved part. In this case, the axial section profile of the worm is comparable, for example, to a sinusoidal line, where the flanks of the worm teeth consist of more than two parts engaging with the worm gear flanks. The axial section profile of the worm thus can consist of a single continuous curve whose one part is sharply curved while whose other part is slightly curved. As an example of curves can be mentioned the ellipse, parabola and hyperbola.

An object of the invention is to provide an improved worm drive.

Another object of the invention is to provide such an improved worm drive which is not confined to a hollow-flank worm and whose engaging and lubricating characteristics are substantially improved as compared to known worm drives with cylindrical worms.

A further object of the invention is to provide an improved worm drive which can transmit higher torques with greater efficiency.

For an understanding of the principles of the invention, reference is made to the following description of typical embodiments thereof as illustrated in the accompanying drawing.

BRIEF DESCRIPTION OF THE DRAWING

In the drawing:

FIG. 1 is an axial sectional view, on the line I—I of FIG. 3, of a worm drive embodying the invention and having concave worm teeth;

FIG. 2 is an axial sectional view, on the line II—II of FIG. 4, of another worm drive embodying the invention and having convex worm teeth;

FIG. 9 is a sectional view, taken on the line IX—IX of FIG. 11, of a worm drive with concave worm teeth whose flanks are formed by a single curve;

FIG. 10 is an axial sectional view, taken on the line X—X of FIG. 12, of a worm drive with convex worm teeth;

FIG. 12 is a view similar to FIG. 11 but related to the worm drive of FIG. 10.

DESCRIPTION OF THE PREFERRED EMBODIMENTS

Figure 3:
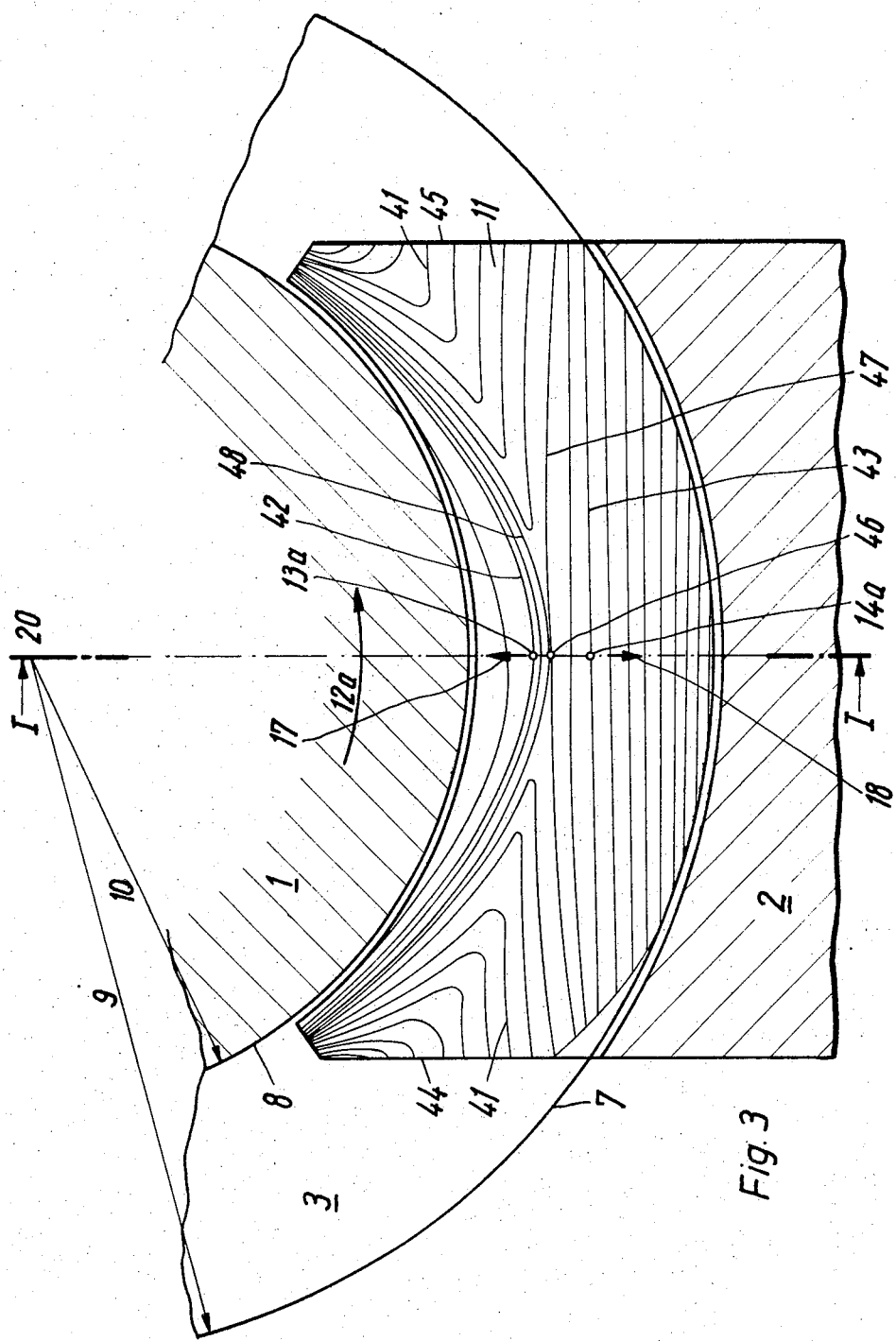
FIG. 3 is a sectional view, at right angles to the section in FIG. 1, of the worm drive shown in FIG. 1, illustrating the contact lines on the tooth flank of the worm gear.

Referring first to FIG. 1, the worm drive illustrated therein includes a worm 1 meshing with a worm gear 2. The worm tooth flank is concave, and is designated at 3, this flank being composed of two engaging flank parts, comprising the arcuated part 4 and the straight part 5. Parts 4 and 5 intersect at point 6. The track of the addendum circle or outer cylinder of worm 1, in an axial section through the worm, is indicated at 7, and the track of the root cylinder is indicated at 8. The outer cylinder has the radius 9 relative to the worm axis, which has not been shown, and the root cylinder has the radius 10 from such worm axis.

Worm gear 2, meshing with worm 1, has convex teeth with tooth flanks generally designated 11. During rotation of worm 1, the worm tooth flanks move in the direction of arrow 12. In the illustrated position, the tooth flanks of the worm and those of the worm gear touch at two contact points through which passes mesh line 15 illustrated as a dash line. Mesh line 15 reverses in the supporting or contacting range of the tooth flanks, with the reversing point or apex 16 of line 15 representing the start of the meshing at the common contact point 6, in an axial section. Thus, at the start of the mesh points 6 and 16 coincide. With further rotation of the worms in the direction of arrow 12, there are formed two contact points on the supporting or engaging parts 4 and 5, and which move along the two legs 15a and 15b of mesh line 15. The contact points move away from point 6, as indicated by arrows 17 and 18. The end position of the main supporting or engaging range is indicated by contact points 13 and 14. Leg 15b of mesh line 15 extends beyond contact point 14 and up to contact point 19. In the secondary supporting or contact region between contact points 14 and 19, the contact of tooth flanks 3 and 11 occurs at only one point.

FIG. 2 is a view similar to FIG. 1 but illustrating a worm having convex worm teeth. Worm 21 meshes with worm gear 22, and the convex worm tooth flank is generally indicated at 23. This convex worm tooth flank comprises an arcuated part 24 and a straight part 25 which merge smoothly at point 26. The track of the outer cylinder of worm 21 is indicated at 27, and that of the root cylinder at 28. The outer cylinder of the worm is at a distance indicated at 29 from the worm axis, and the root cylinder of the worm is at the distance 30 from the worm axis, the worm axis not being shown. The flanks of the worm gear teeth are generally indicated at 31 and, during rotation of worm 21, the worm tooth flank moves in the direction of arrow 32. The contact points corresponding to the contact points 13 and 14 of FIG. 1 are indicated at 33 and 34, respectively. Mesh line 35 extends in a direction opposite to the direction of extent of mesh line 15 of FIG. 1, due to the convex tooth form of worm 21, and the apex of mesh line 35 represents the end of the mesh, In this case, point 26 coincides with point 36. The oppositely directed travel of contact points 33 and 34 toward point 26 is indicated by the respective arrows 37 and 38. The main supporting or contacting region of the tooth flanks is between contact point 33, 34 and 36 within mesh line 35, which also reverses and which has two legs 35a and 35b.

In the example illustrated in FIG. 2, the main supporting region extends over two teeth of the worm and of the worm gear, with contact points 33a and 34a being formed on the adjacent tooth flanks. The secondary supporting region is on the leg 35b of the mesh line, to the right of contact point 34 as viewed in FIG. 2.

FIG. 3 is a partial sectional view of the embodiment of the invention shown in FIG. 1, worm 1 being shown in partial diametric section and worm gear 2 being shown in partial axial section. The reference numbers correspond to those used in FIG. 1, with one indicating the worm, 2 the worm gear, 3 the flank of the worm tooth, 7 the outer cylinder of the worm, 8 the root cylinder of the worm, 9 and 10 the respective distances of these cylinders from the worm axis 20, and 11 the worm gear tooth flank. Arrow 12a indicates the direction of rotation of worm 1, two contact points in the axial section I—I are indicated at 13a and 14a, and the oppositely directed arrows, corresponding to those in FIG. 1, are indicated at 17 and 18.

FIG. 3 illustrates the family of contact lines, generally designated 41, formed on the tooth flank 11 of worm gear 1. Associated with contact point 13a there is contact line 42, and associated with contact point 14a, there is contact line 43. At the start of the mesh, there are formed contact lines on the two plane surfaces 44 and 45 of worm gear 2. In the course of the mesh, these contact points move toward each other in the direction of the axial section I—I and close increasingly the space between the contact lines opening toward plane surfaces 44 and 45. In the further course of the mesh, the contact lines reach, from both sides, point 46 in the axial section. Point 46 of FIG. 3 corresponds with point 16 of FIG. 1, and has corresponding thereto two contact lines 47 and 48. Contact line 47 defines a space which is open toward outer cylinder 7 of worm 1, and contact line 48 defines a space which is open toward root cylinder 8 of worm 1. Both spaces are increasingly closed in the further course of the mesh, toward plane surfaces 44 and 45, and these spaces form narrowing oil chambers.

Figure 4:
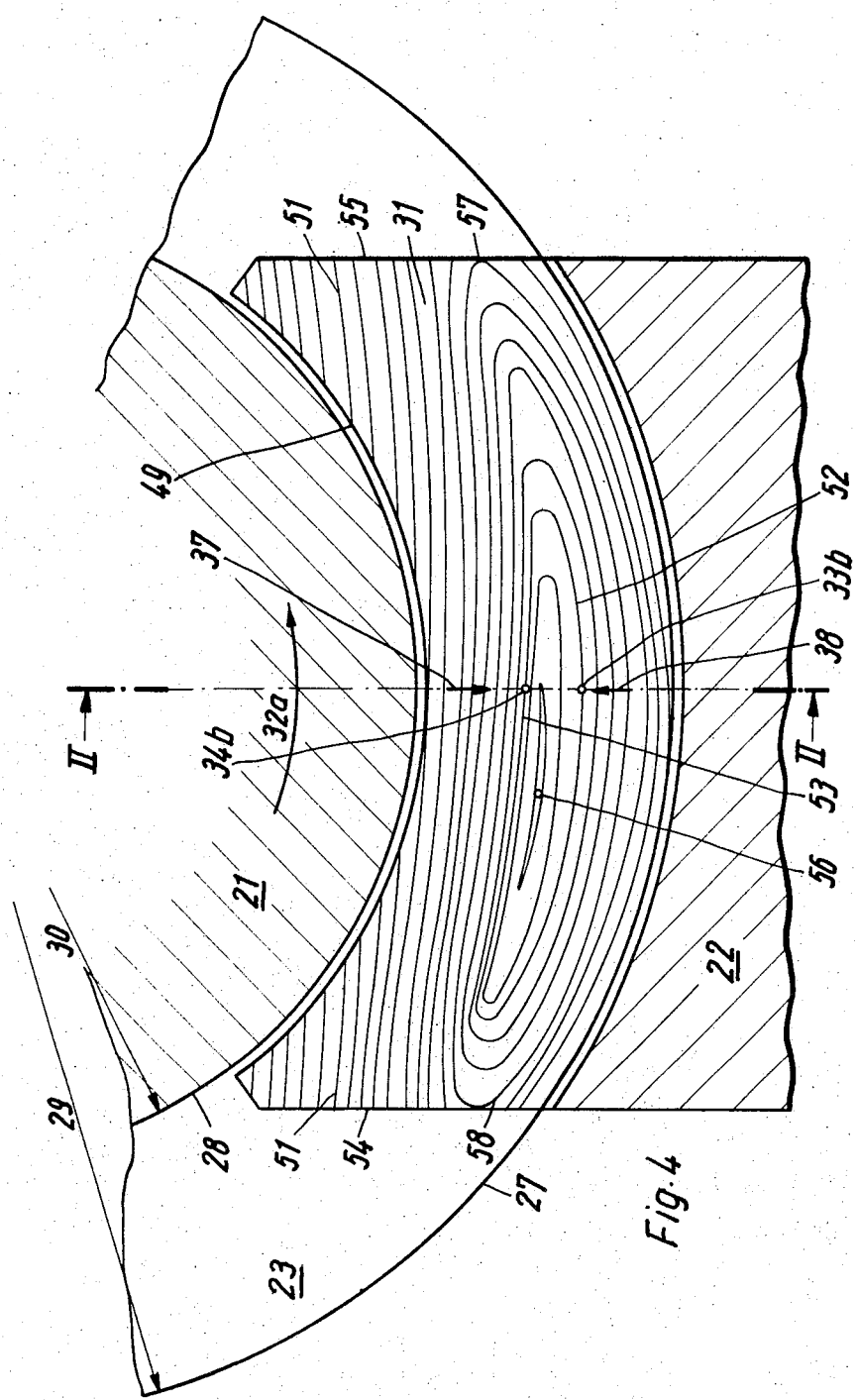
FIG. 4 is a view, similar to FIG. 3, but related to the worm drive shown in FIG. 2.

FIG. 4 is a view similar to FIG. 3 but related to the embodiment of the invention shown in FIG. 2, with 21 being the worm, 22 the worm gear, 23 the flank of the worm tooth, 27 the outer cylinder of the worm, 28 the root cylinder of the worm, and 29 and 30 the respective distances of these two cylinders from the worm axis which extends perpendicularly to the plane of FIG. 4. The flank of the worm gear tooth is indicated at 31, and 32a indicates the direction of rotation of worm 1, 33b and 34b indicate the two contact points in the axial section II—II, and 37 and 38 the oppositely directed arrows corresponding to those of FIG. 2.

FIG. 4 shows a family of contact lines, generally indicated at 51, formed on the flank 31 of the tooth of worm gear 22. In the course of the mesh, these contact lines move in the direction of the arrow 37 until two contact lines appear in the main supporting or contact region and move toward each other in the direction of arrows 37 and 38. The two contact lines combine, for the first time, at the point 57 on plane surface 55. In the further course of the mesh, the two contact lines combine to form a closed curve 58 which narrows up to the extremal contact point 56.

Contact points 33b and 34b are points on one of the closed curves described above, and which is composed of the two contact lines 52 and 53. Curve 58 defines a completely enclosed oil chamber which narrows increasingly during the course of the mesh, and which forces the oil contained therein through the flank gap which is formed.

Figure 7:
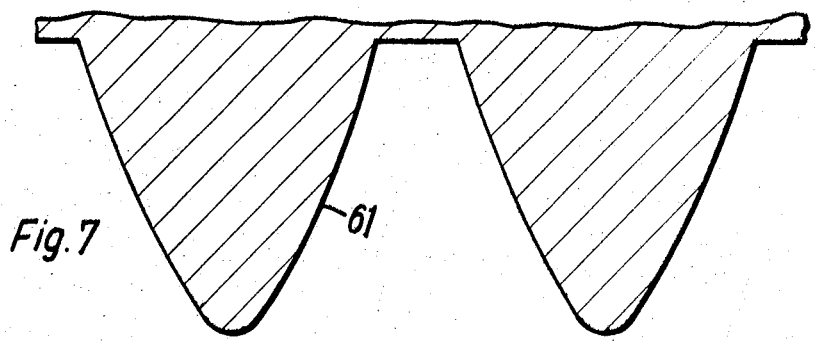
FIG. 7 is an axial sectional view of a worm with teeth having a hyperbolic profile.
Figure 6:
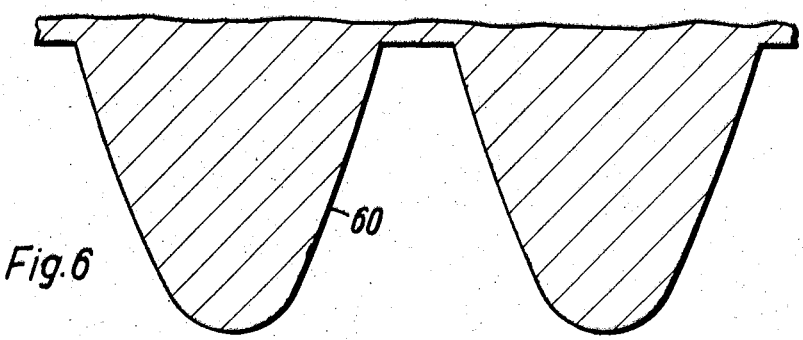
FIG. 6 is an axial sectional view of a worm with teeth having a parabolic profile.
Figure 5:
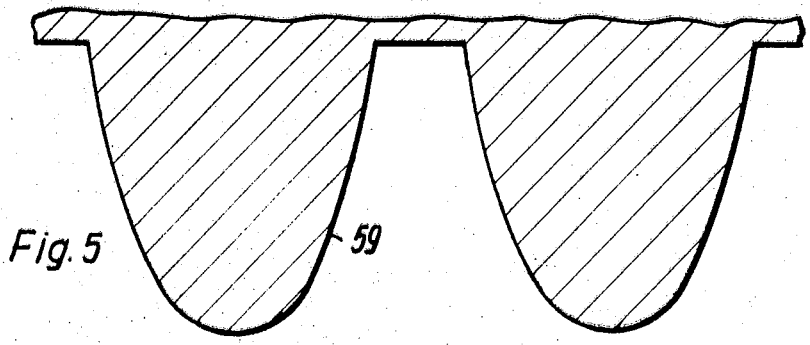
FIG. 5 is an axial sectional view of a worm with teeth having an elliptic profile.

The tooth flanks of the worms shown in FIG. 1 and 2 each comprise an arcuated part and a straight part. In the axial section of the worm, the profile can also comprise a single curve having one part sharply curved and the other part slightly curved, with a continuous transition. Examples of these curves are shown in FIGS. 5, 6 and 7. In FIG. 5, the tooth flank profile 59, in axial section, is part of an ellipse. In FIG. 6, the tooth flank profile 60, in axial section, is a part of a parabola. In FIG. 7, the tooth flank profile 61, in axial section, is part of a hyperbola.

FIGS. 5, 6 and 7 illustrate worms with convex teeth, similar to the worm 21 of FIG. 2. The teeth can also be concave, and have flanks which are parts of ellipses, parabolas, or hyperbolas, thus being similar to the worm 1 of FIG. 1. The mesh line of the convex tooth forms corresponds to the mesh line 35 of FIG. 2 but, with a concave tooth form, the mesh line would correspond to mesh line 15 of FIG. 1.

Figure 8:
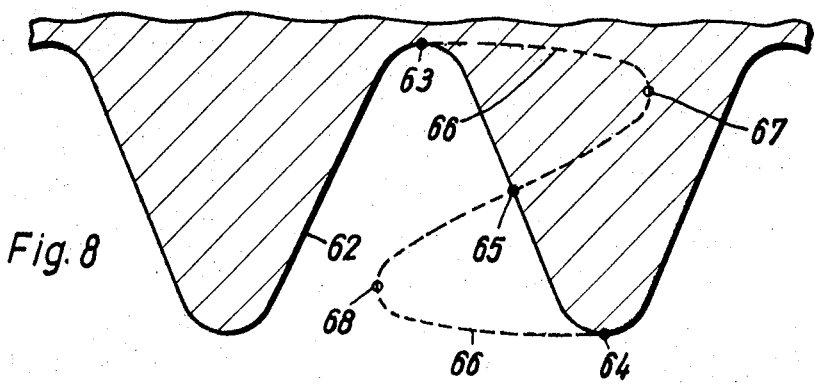
FIG. 8 is an axial sectional view of a worm with teeth having a sinusoidal profile.

FIG. 8 illustrates another worm whose tooth flank profile 62, in axial section, is a sinusoidal line composed of three parts including two sharply curved parts on the outer and inner cylinders of the worm and one substantially straight part between these two sharply curved parts. These tooth flank parts are arranged between points 63 and 64 which are, at the same time contact points, and which correspond to the contact points 13 in FIG. 1 and 33 in FIG. 2. Mesh line 68 is composed, in a similar manner, of mesh line 15 of FIG. 1 and mesh line 35 of FIG. 2, and has a double reversal with apices 67 and 68. In each engagement phase of the tooth flanks there are formed two contact points. The mesh starts in point 67 and ends in point 68. In the illustrated center position, there are three contact points, namely 63, 64 and 65.

Figure 11:
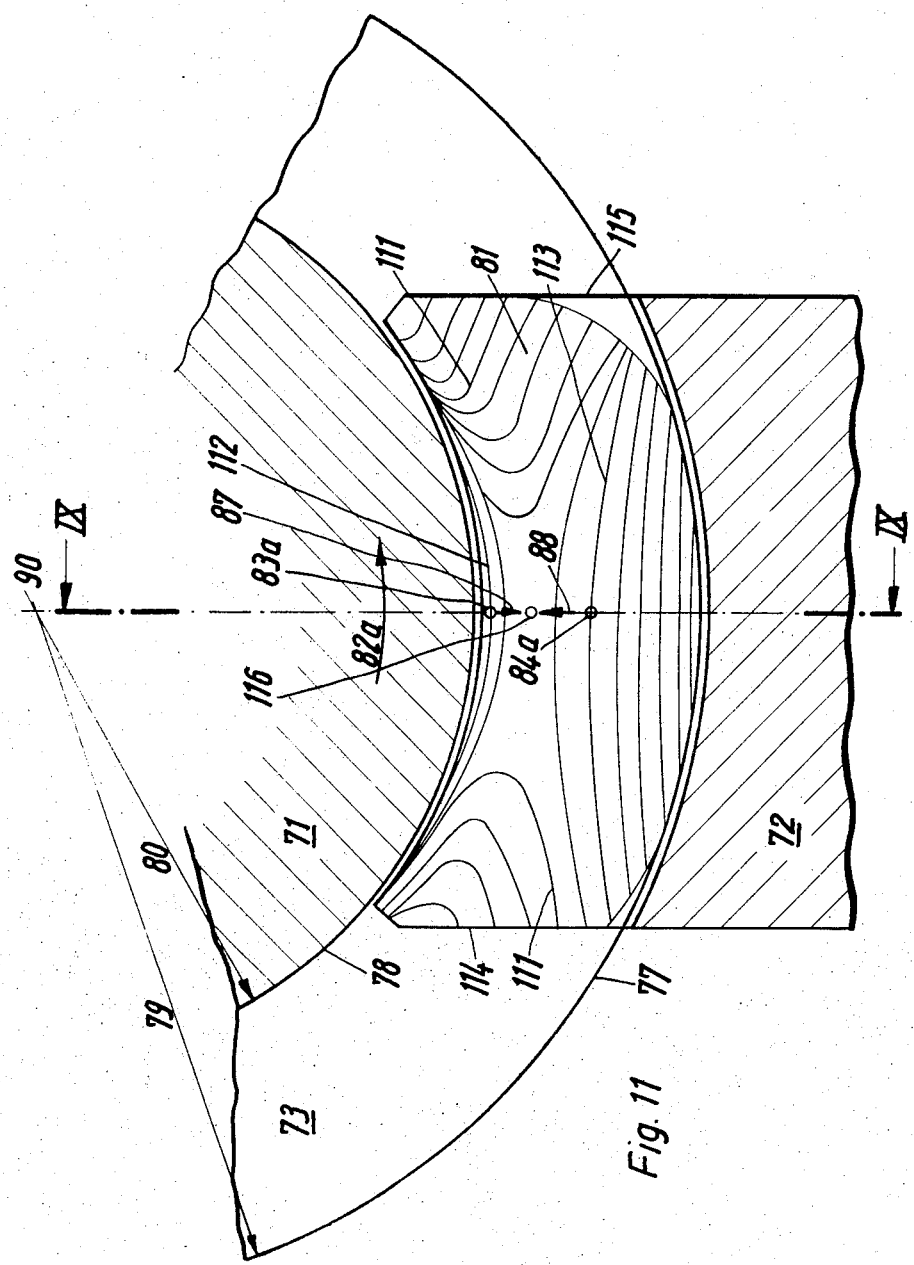
FIG. 11 is a sectional view, taken at right angles to the section of FIG. 9, of the worm drive shown in FIG. 9 and illustrating the contact lines on the tooth flank of the worm gear.

FIGS. 9 and 11 shown the mesh condition for flank profile forms having a single curve, such as shown in FIGS. 5 through 7, namely with concave worm teeth, and FIGS. 10 and 12 correspondingly illustrate these flank profiles with convex worm teeth.

Referring to FIG. 9, a worm 71 is illustrated as meshing with a worm gear 72, the flank of the worm tooth being concave as indicated at 73. FIG. 9 represents a partial axial section through the worm and a partial diametric section through the worm gear. The profile of the worm tooth flank in axial section comprises a sharply curved part 74 and a slightly curved part 75, merging with each other without any transition point. The track of the outer cylinder of the worm, in axial section, is indicated at 77 and the track of the root cylinder at 78. The outer cylinder is spaced by the distance 79 from the worm axis, which has not been shown, and the root cylinder is spaced by the distance 80 from the worm axis.

Worm gear 72, which meshes with worm 71, has convex teeth whose flank is generally designated 81. During rotation of worm 71, the worms tooth flanks move in the direction of arrow 82 and, in the illustrated position, the tooth flanks of worm 71 and of worm gear 72 engage at two contact points 83 and 84 through which there passes mesh line 85 indicated by a dash line. Mesh line 85 reverses in the supporting or contact range of the tooth flanks, with its apex 86 representing the start of the mesh, in axial section. During rotation the worm 71 in the direction of arrow 82, there are formed two contact points 74 and 75 on the engaging parts, and these move along the respective legs 85a and 85b of mesh line 85. The two contact points move away from each other from the start of the mesh, as indicated by arrows 87 and 88. The end poisition in the main contact region is indicated by contact points 83 and 84. Leg 85b of mesh line 85 extends beyond contact point 84 and up to contact point 89. In the secondary supporting or contact region between contact points 84 and 89, the contact between tooth flanks 73 and 81 occurs at only one point.

FIG. 10 illustrates a section similar to FIG. 9, but with the worm teeth being convex. In FIG. 10, a worm 91 meshes with a worm gear 92, and the convex flank of the worm tooth is generally indicated at 93. The flank profile, in axial section, comprises a sharply curved part 94 and a slightly curved part 93 which merge smoothly with each other without any transition. The track of the outer cylinder of worm 91 is indicated at 97 and that of the root cylinder at 98, with the outer cylinder having the distance 99 and the root cylinder the distance 100 from the worm axis, which latter has not been shown. The flank of the concave teeth of worm gear 92 is generally designated 101 and, during rotation of worm 91, the flank of the worm tooth moves in the direction of arrow 102.

Contact points 103 and 104 are arranged on mesh line 105 which extends in a direction opposite to the extent of mesh line 85 of FIG. 9, due to the convex tooth form of worm 91. The apex 106 of mesh line 105 represents the end of the mesh. The oppositely directed movement of contact points 103 and 104 is indicated by the arrows 107 and 108. In the embodiment illustrated in FIG. 10, the main supporting or contact region of the tooth flanks extends practically over the entire course of the mesh line 105, having the legs 105a and 105b.

FIG. 11 illustrates the worm drive of FIG. 9 in a section taken at right angles to the section shown in FIG. 9, and with corresponding reference numbers. The worm is indicated at 71, the worm gear at 72, the flank of the worm tooth at 73, the outer cylinder of the worm at 77, and the root cylinder of the worm at 78. The outer cylinder is spaced the distance 79 from worm axis 90 and the root cylinder is spaced the distance 80 from the worm axis. The flank of the worm gear tooth is indicated at 81, arrow 82a indicates the direction of rotation of the worm 71, 83a and 84a indicate two contact points in the axial section IX—IX, and 87 and 88 indicate the oppositely directed arrows corresponding to those in FIG. 9.

In FIG. 11, the family of contact lines, formed on the flank 81 of the tooth of worm gear 72 is generally indicated at 111. A contact line 112 is associated with contact point 83a and the contact line 113 is associated with contact point 84a.

At the start of the mesh, contact lines are formed on the two plane surfaces 114 and 115 of worm gear 72, and these contact lines move, in the course of the mesh, toward each other in the direction of the axial section IX—IX and close increasingly the space between the contact lines toward the plane surfaces 114 and 115. In the further course of the mesh, the contact lines reach, from both sides, the axial section at point 116. In the further course of the mesh, the contact lines move in the direction of the arrows 87 and 88 to the root cylinder and to the outer cylinder of worm 71. The contact lines define two spaces, one of which is open toward the root cylinder 78 of the worm and the other toward the outer cylinder 77 of the worm. Both spaces are increasingly closed, in the course of the mesh, toward plane surfaces 114 and 115, so as to form narrowing oil chambers.

FIG. 12 is a section through the worm drive of FIG. 10, taken at right angles to the section of FIG. 10, and indicating worm 91, worm gear 92, flank 93 of the worm tooth, outer cylinder 97 of the worm and root cylinder 98 thereof. Outer cylinder 97 has a distance 99 from the worm axis, which has not been shown, and root cylinder 98 has a distance 100 from the worm axis. The flank of the tooth of worm gear 92 is indicated at 101, the direction of rotation of worm 91 is indicated by the arrow 102a, and 103b and 104b are two contact or engagement points in axial section X—X. 107 and 108 represent the oppositely directed arrows corresponding to those in FIG. 10.

FIG. 12 illustrates the family of contact lines 121 formed on the flank 101 of the tooth of worm gear 92. Associated with contact point 103b there is a contact line 122, and a contact line 123 is associated with contact point 104b.

At the start of the mesh, contact lines are formed on the addendum circle 119 of worm gear 91, and these contact lines move, in the course of the mesh, in the direction of arrow 107 until two contact lines appear in the main supporting or engaging region. These contact lines move toward each other in the direction of arrows 107 and 108, and combine, for the first time, on the plane surface 125 close to point 127. During the further course of the mesh, the two contact lines combine to form a self-contained curve 128, which is likewise closed in the proximity of plane surface 124. Curve 128 narrows increasingly up to the extremal contact point 126.

Contact points 103b and 104b are points on the closed curve 128 composed of contact lines 122 and 123. Curve 128 defines a completely enclosed oil chamber which narrows increasingly during the course of the mesh, and which forces the oil contained therein through the flank gap.

While specific embodiments of the invention have been shown and described in detail to illustrate the application of the principles of the invention, it will be understood that the invention may be embodied otherwise without departing from such principles.

What is claimed is:

1. A worm drive including a cylindrical worm and a worm gear, having arcuated corresponding engaging tooth flank profiles, with a mesh line in the engaging region, the improvement comprising the flanks of the teeth of the worm each consisting of at least two flank parts engaging with the flanks of the worm gear teeth; one flank part, in the axial section through the worm, having a profile inclined relative to a perpendicular to the worm axis and at least approximating a straight line; the other flank part, in the axial section through the worm, having a sharply curved profile; said mesh line reversing in the region of engagement between the flanks of the worm teeth and the flanks of the worm gear teeth.

2. In a worm drive, the improvement claimed in claim 1, in which the profile of said one flank part is a straight line.

3. In a worm drive, the improvement claimed in claim 1, in which the profile of said one flank part is slightly convex.

4. In a worm drive, the improvement claimed in claim 1, in which the profile of said one flank part is slightly concave.

5. In a worm drive, the improvement claimed in claim 1, in which the profile of the other flank part is convex toward said worm gear.

6. In a worm drive, the improvement claimed in claim 1, in which the profile of said other flank part is concave toward said worm gear.

7. In a worm drive, the improvement claimed in claim 1, in which the profile of the flank of the worm teeth, in the axial section through the worm, comprises a convex flank part sharply curved toward said worm gear, a concave flank part sharply curved toward said worm gear, and a substantially straight flank part interconnecting said convex and concave flank parts.

8. In a worm drive, the improvement claimed in claim 1, in which the profile of the flank of the worm gear teeth, in the axial section through the worm, comprises a single curve having one part sharply curved and the other part slightly curved.

9. In a worm drive, the improvement claimed in claim 8, in which the flank of the worm tooth constitutes part of an ellipse.

10. In a worm drive, the improvement claimed in claim 8, in which the flank of the worm tooth constitutes part of a parabola.

11. In a worm drive, the improvement claimed in claim 8, in which the flank of the worm tooth constitutes part of an hyperbola.

* * * * *